(12) United States Patent
Li et al.

(10) Patent No.: US 10,909,415 B2
(45) Date of Patent: Feb. 2, 2021

(54) METHOD, DEVICE AND COMPUTER PROGRAM PRODUCT FOR GENERATING IMAGE TAG

(71) Applicant: EMC IP Holding Company LLC, Hopkinton, MA (US)

(72) Inventors: Sanping Li, Beijing (CN); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 100 days.

(21) Appl. No.: 16/172,158

(22) Filed: Oct. 26, 2018

(65) Prior Publication Data

US 2019/0171907 A1 Jun. 6, 2019

(30) Foreign Application Priority Data

Oct. 27, 2017 (CN) .......................... 2017 1 1022188

(51) Int. Cl.
*G06K 9/62* (2006.01)
*G06F 16/51* (2019.01)
*G06F 16/58* (2019.01)
*G06F 16/583* (2019.01)

(52) U.S. Cl.
CPC .......... *G06K 9/6215* (2013.01); *G06F 16/51* (2019.01); *G06F 16/583* (2019.01); *G06F 16/5866* (2019.01); *G06K 9/6202* (2013.01)

(58) Field of Classification Search
CPC .. G06K 9/6215; G06K 9/6202; G06F 16/583; G06F 16/5866; G06F 16/51
See application file for complete search history.

(56) References Cited

U.S. PATENT DOCUMENTS

| | | | |
|---|---|---|---|
| 10,659,329 B1 | 5/2020 | Zhao et al. | |
| 10,698,925 B1 | 6/2020 | Zhao et al. | |
| 2007/0255695 A1* | 11/2007 | Hu | ............................ G06F 16/58 |
| 2009/0279794 A1* | 11/2009 | Brucher | .................. G06F 16/51 |
| | | | 382/225 |
| 2012/0072410 A1* | 3/2012 | Wang | .................... G06F 16/532 |
| | | | 707/711 |
| 2013/0016916 A1* | 1/2013 | Mass | .................... G06F 11/1471 |
| | | | 382/218 |
| 2017/0255462 A1* | 9/2017 | Azagury | .................. G06F 8/52 |

* cited by examiner

*Primary Examiner* — Syed Haider
(74) *Attorney, Agent, or Firm* — Ryan, Mason & Lewis, LLP

(57) ABSTRACT

Embodiments of the present disclosure relate to a method, a device and a computer readable medium for generating an image tag. According to the embodiments of the present disclosure, an index value of an image is determined based on contents of the image, similarities between a plurality of images is determined based on index values of the plurality of images, and thereby tags are generated for images. According to the embodiments of the present disclosure, images is further grouped depending on similarities between them.

20 Claims, 7 Drawing Sheets and its variants are to be read as open-ended terms that mean "includes, but is not limited to." The term "or" is to be read as "and/or" unless the context clearly indicates otherwise. The term "based on" is to be read as "based at least in part on." The terms "one

METHOD, DEVICE AND COMPUTER PROGRAM PRODUCT FOR GENERATING IMAGE TAG

RELATED APPLICATIONS

This application claims priority from Chinese Patent Application Number CN 201711022188.X, filed on Oct. 27, 2017 at the State Intellectual Property Office, China, titled "METHOD, DEVICE AND COMPUTER-READABLE MEDIUM FOR GENERATING TAG FOR IMAGE" the contents of which are incorporated by reference herein in their entirety.

FIELD

Embodiments of the present disclosure generally relate to image management, and more specifically, to a method, a device and a computer readable medium for generating an image tag.

BACKGROUND

Container technologies (Docker) are widely adopted in current cloud computing environments, especially Platform as a Service (PaaS). More and more services are built, dispatched and deployed as containers. Further, services can be quickly and flexibly built due to the layer structures of container and loosely-coupled interconnection as microservices during container running. In particular, Docker makes further encapsulation on the container basis, and greatly simplifies the creation and maintenance of containers from the file system, internetworking to process isolation and the like. As a result, Docker technologies are made more lightweight and quicker than virtual machine technologies.

As many developers and users start to build, deploy and share container images in PaaS, container technologies are confronted with new problems to be solved.

SUMMARY

Embodiments of the present disclosure provide a method, a device and a corresponding computer program product for image management.

According to a first aspect of the present disclosure, there is provided a method for generating an image tag. The method comprises: determining, based on a first image, a first group of index values, each index value in the first group of index values indicating a content of each layer of a plurality of layers of the first image; determining, based on a second image, a second group of index values, each index value in the second group of index values indicating a content of each layer of a plurality of layers of the second image; determining a similarity between the first image and the second image based on the first group of index values and the second group of index values; and generating, based on the similarity, a tag associated with at least one of the first image and the second image.

According to a second aspect of the present disclosure, there is provided a device for generating an image tag. The device comprises: at least one processor; and a memory coupled to the at least one processor, the memory having instructions stored thereon, the instructions, when executed by the at least one processor, causing an electronic device to perform acts including: determining, based on a first image, a first group of index values, each index value in the first group of index values indicating a content of each of a plurality of layers of the first image; determining, based on a second image, a second group of index values, each index value in the second group of index values indicating a content of each layer of a plurality of layers of the second image; determining a similarity between the first image and the second image based on the first group of index values and the second group of index values; and generating, based on the similarity, a tag associated with at least one of the first image and the second image.

According to a third aspect of the present disclosure, there is provided a computer readable medium. The computer readable medium is stored with machine executable instructions thereon, the instructions, when executed by at least one processing unit of a machine, causing the machine to implement the method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of example embodiments of the present disclosure with reference to the accompanying drawings, the above and other objectives, features, and advantages of the present disclosure will become more apparent, wherein the same reference sign usually refers to the same component in the example embodiments of the present disclosure.

DETAILED DESCRIPTION OF EMBODIMENTS

Figure 1:
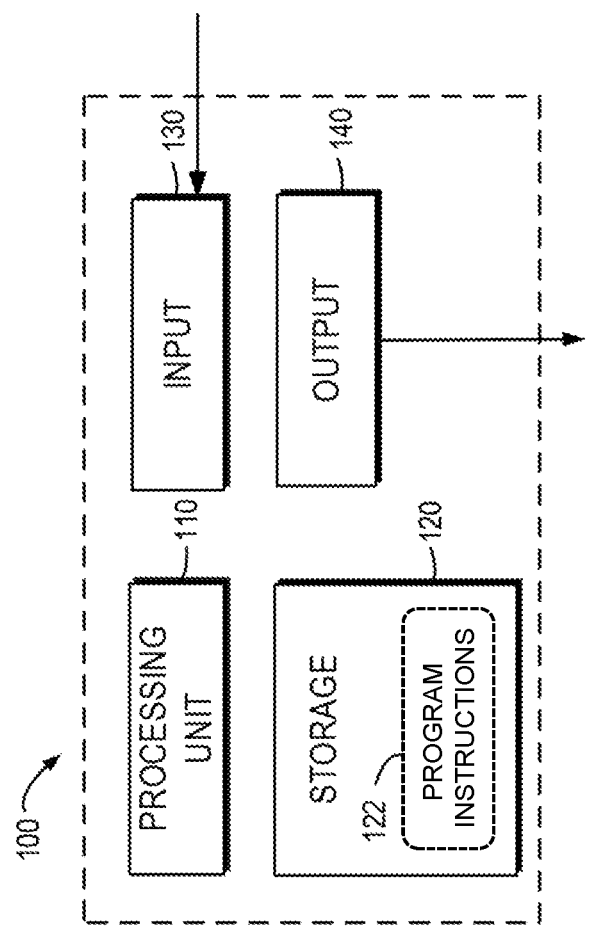
FIG. 1 shows a schematic block diagram of a device according to embodiments of the present disclosure.

The example embodiments of the present disclosure will be described in more detail with reference to the drawings. Although the drawings illustrate the example implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "include" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least one further embodiment." The terms "first", "second" and so on can refer to same or different objects. The following text also can comprise other explicit and implicit definitions.

As used herein, the term "image" refers to a special file system which, in addition to providing files needed at container runtime (such as programs, libraries, resources and configuration needed), further includes some configuration parameters prepared for runtime (for example, anonymous volumes, environment variables, users and the like). The image does not include any dynamic data, and its contents remain constant after the image is built.

As an image comprises a complete root file system of the operating system, it is bulky. In Docker design, the image is designed as a layered storage architecture by making sufficient use of union file system (Union FS) technology. Strictly speaking, the image is not a package file like an international standard compact disc file system format but a virtual concept, and its actual implementation is composed of a group of file systems rather than one file, or to say, is composed of multi-layer file systems.

While building the image, a layer-by-layer approach is adopted, and the upper layer acts as a basis for the lower layer. Each layer remains constant once built, and any change at the lower layer only involves the current layer. For example, an operation of deleting the upper layer file is not really to delete the upper layer file but only to mark the file as deleted at the current layer. When the final container runs the image, although the file will not be seen, it will always follow the image. Therefore, when building the image, extreme caution should be taken to guarantee that each layer comprises only things to be added at this layer and any extras should be cleared before finishing the building of this layer.

The character of the layered storage makes the multiplexing and customization of the image much easier. Even an image that was built previously may be used as a base layer, and further a new layer is added so as to customize one's own contents and build a new image.

As described above, container technologies such as Docker are widely applied. Usually, a user may upload a new image or create one from existing images, meanwhile the user adds a tag to the image in order to describe the image. The image created or uploaded by the user may be stored in a local storage device or a distributed storage device. Other users may search for the image in the storage device by inputting a keyword. However, there are some problems in conventional solutions.

For example, contents of the image are determined based on the tag created by the user, so tag contents might be inconsistent with actual contents of the image. In addition, there lacks a method for determining a content similarity between images in a quantitative way.

To at least partially solve the above and other potential problems and drawbacks, embodiments of the present disclosure provide a method for generating an image tag.

FIG. 1 shows a schematic block diagram of a device 100 which is suitable to implement embodiments of the present disclosure. It should be appreciated that the device 100 may be implemented at a server or at a cloud server platform. As shown, the device 100 comprises a processing unit 110, a storage 120, an input 130 and an output 140. The processing unit 110 may execute various suitable actions and processing based on computer program instructions 122 stored in the storage 120. It should be understood that the device 100 may further comprise any other appropriate device.

Specifically, the processing unit 110 may compare a content similarity between images received from the input 130 or images stored in the storage 120, so as to generate tags. The storage 120 may store images, tags generated by the processing unit 110, as well as groups of images.

Figure 2:
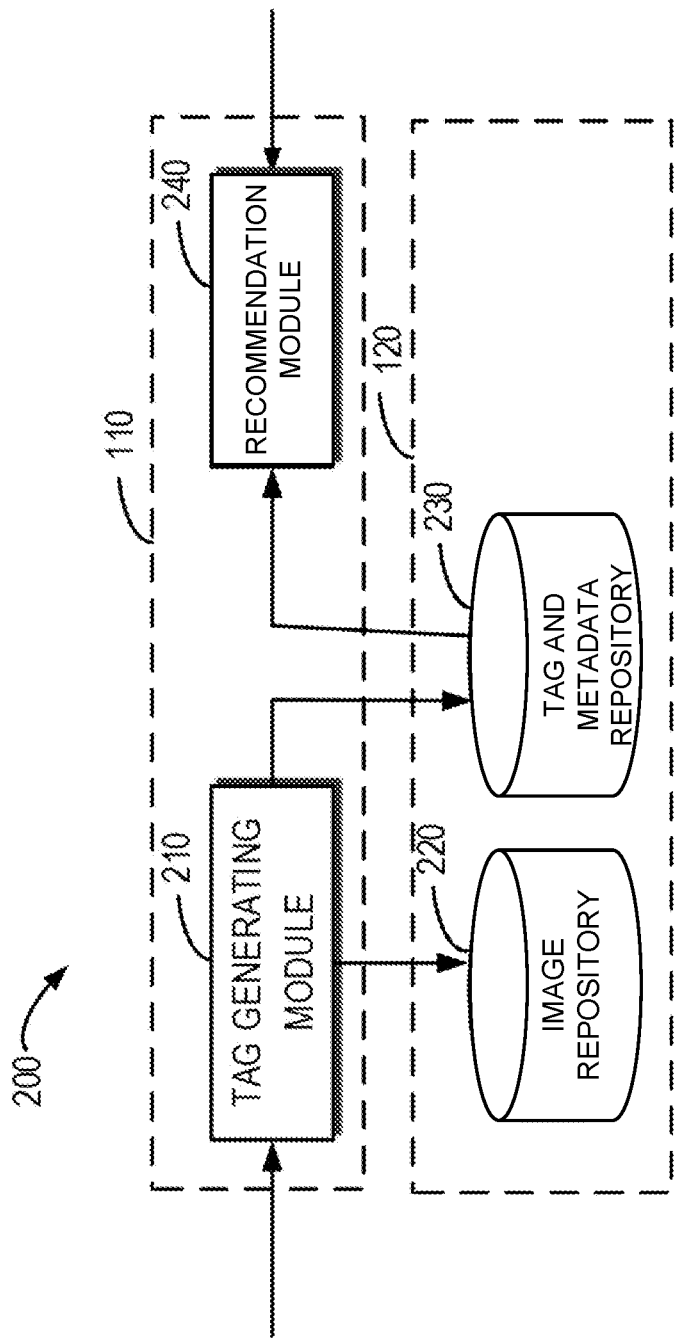
FIG. 2 shows a schematic block diagram of a system structure according to embodiments of the present disclosure.

FIG. 2 shows a schematic block diagram of a system 200 according to some embodiments of the present disclosure. The system 200 is an example of the device 100 as shown in FIG. 1. In the example, the system 200 comprises the processing unit 110 and the storage 120. The processing unit 110 may comprise: a tag generating module 210 and a recommendation module 240. The storage 120 may comprise: an image repository 220 and a tag and metadata repository 230.

The tag generating module 210 may be configured to generate a tag based on contents of a received image. The image repository 220 may be configured to store images in the system. The tag and metadata repository 230 may be configured to store tags of images and metadata associated with groups of images. The recommendation module 240 may be configured to search for a matched result from groups of images based on a keyword inputted by a user. Note the system 200 shown in FIG. 2 is merely an example and not limiting in any way. It should be understood the system 200 may comprise any suitable module, such as a control panel module, etc.

Figure 3:
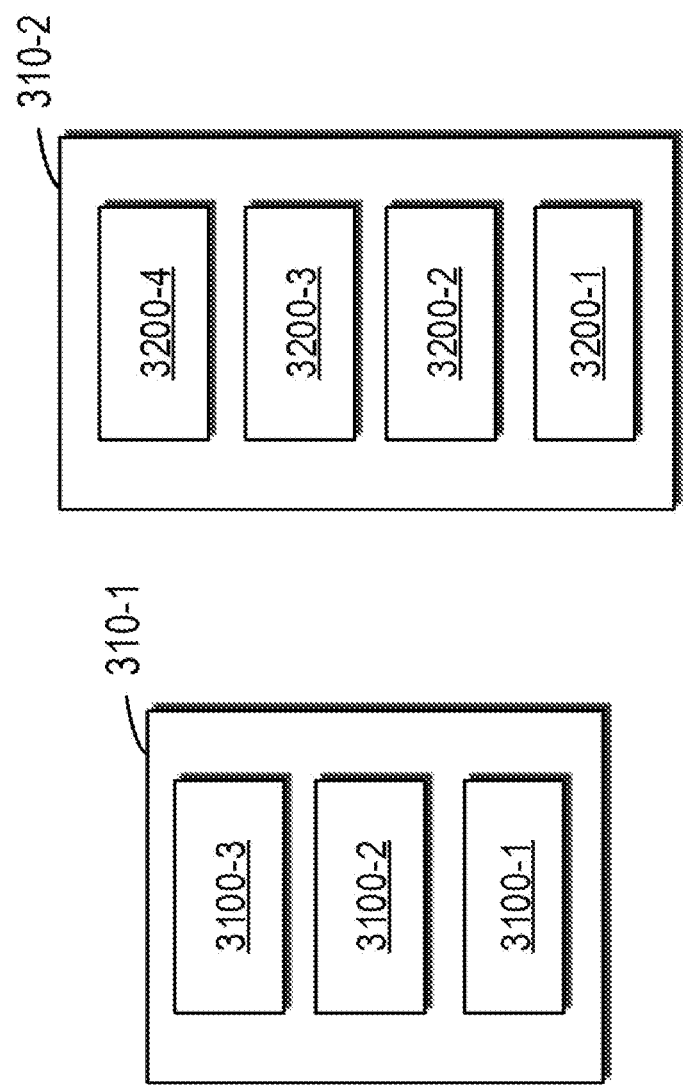
FIG. 3 shows a schematic view of a structure of an image according to embodiments of the present disclosure.

FIG. 3 shows a schematic view of a structure of an image according to embodiments of the present disclosure. Note FIG. 3 merely illustrates structures of a first image 310-1 and a second image 310-2. As described above, the image is built layer by layer. In the example shown in FIG. 3, the first image 310-1 comprises a layer 3100-1, a layer 3100-2, and a layer 3100-3, and may comprise other arrangements of additional or alternative layers not explicitly shown, up to and including a layer 3100-N (collectively referred to as "a layer 3100", wherein N is a natural number greater than 1). The second image 310-2 comprises a layer 3200-1, a layer 3200-2, a layer 3200-3, and a layer 3200-4, and may comprise other arrangements of additional or alternative layers not explicitly shown, up to and including a layer 3200-M (collectively referred to as "a layer 3200", wherein M is a natural number greater than 1). It should be understood the number of layers in the first image 310-1 and the second image 310-2 are merely examples and not limitations.

Figure 4:
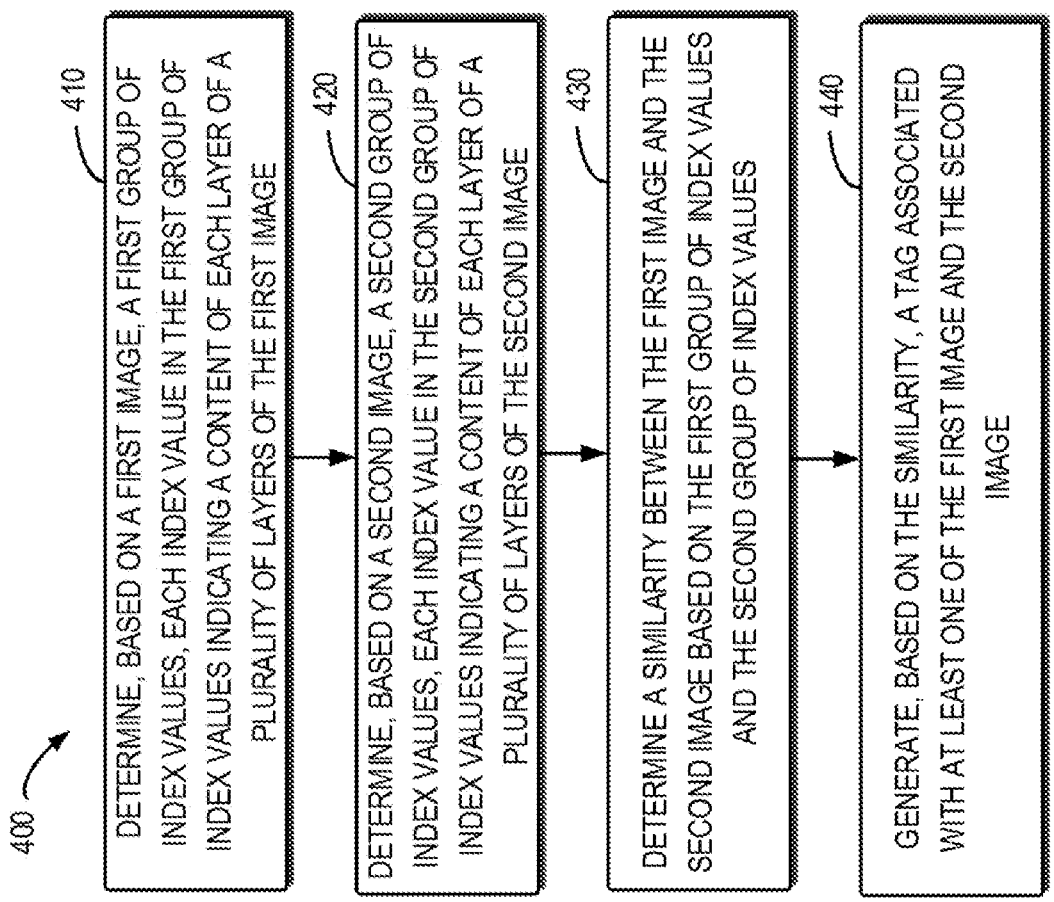
FIG. 4 shows a flowchart of a procedure or method for image generation according to embodiments of the present disclosure.

FIG. 4 shows a flowchart of a method 400 for generating an image tag according to embodiments of the present disclosure. The method 400 may be implemented in the device 100 shown in FIG. 1. Now description is presented to the method shown in FIG. 4 with reference to FIG. 3.

At block 410, the device 100 determines a first group of index values based on the first image 310-1. Each value in the first group of index values indicates contents of each layer of the plurality of layers 3100 in the first image. In some embodiments, the first image 310-1 may be pre-stored in the local image repository 220. In other embodiments, the first image 310-1 may be received via the receiving device 130. In a further embodiment, the first image 310-1 may be stored in a repository accessible to the device 100. In some embodiments, the device 100 may store the first group of index values in the storage 120 or a remotely accessible storage device.

At block 420, the device 100 determines a second group of index values based on the second image 310-2. Each value in the second group of index values indicates contents of each layer of the plurality of layers 3200 in the second image. In some embodiments, the second image 310-2 may be pre-stored in the local image repository 220. In other embodiments, the second image 310-2 may be received via the receiving device 130. In a further embodiment, the second image 310-2 may be stored in a repository accessible to the device 100. In some embodiments, the device 100 may store the second group of index values in the storage 120 or a remotely accessible storage device.

In one example embodiment, the device 100 may obtain respective contents of each layer 3100 of the first image 310-1 and each layer 3200 of the second image 310-2. The device 100 may determine an index value for contents of each layer. Only as an example, the device 100 may obtain a value of a character string of each layer of the first image 310-1 and the second image 310-2. The device 100 may also perform hash computation to the value of the character string of each layer so as to determine an index value of the layer. In some embodiments, the device 100 may also utilize an identification of each layer of the first image 310-1 and the second image 310-2 to determine the index value.

In another example embodiment, the index value of the first image 310-1 may be stored in the storage 120, and the device 100 may obtain the first group of index values of the first image 310-1 from the storage 120.

At block 430, the device 100 determines a similarity between the first image 310-1 and the second image 310-2 based on the first group of index values and the second group of index values.

In one example embodiment, the device 100 may compare at least one value in the first group of values with a group of candidate values in the second group of values to obtain a group of similarities. Only as an example, the device 100 may calculate the Hamming distances between at least one value in the first group of values and a group of candidate values in the second group of values to obtain a group of similarities. In another embodiment, the device 100 may calculate edit distances between at least one value in the first group of values and a group of candidate values in the second group of values to obtain a group of similarities. The device 100 may further obtain the group of similarities by calculating Euclidean distances. The device 100 may also obtain the group of similarities by calculating Levenshtein distances. It should be understood that except the above methods, the device 100 may use any other suitable methods (for example, Lee Distance and cosine value) for comparing at least one value in the first group of values with a group of candidate values in the second group of values to obtain a group of similarities. Embodiments of the present disclosure are not limited in this aspect.

Figure 5:
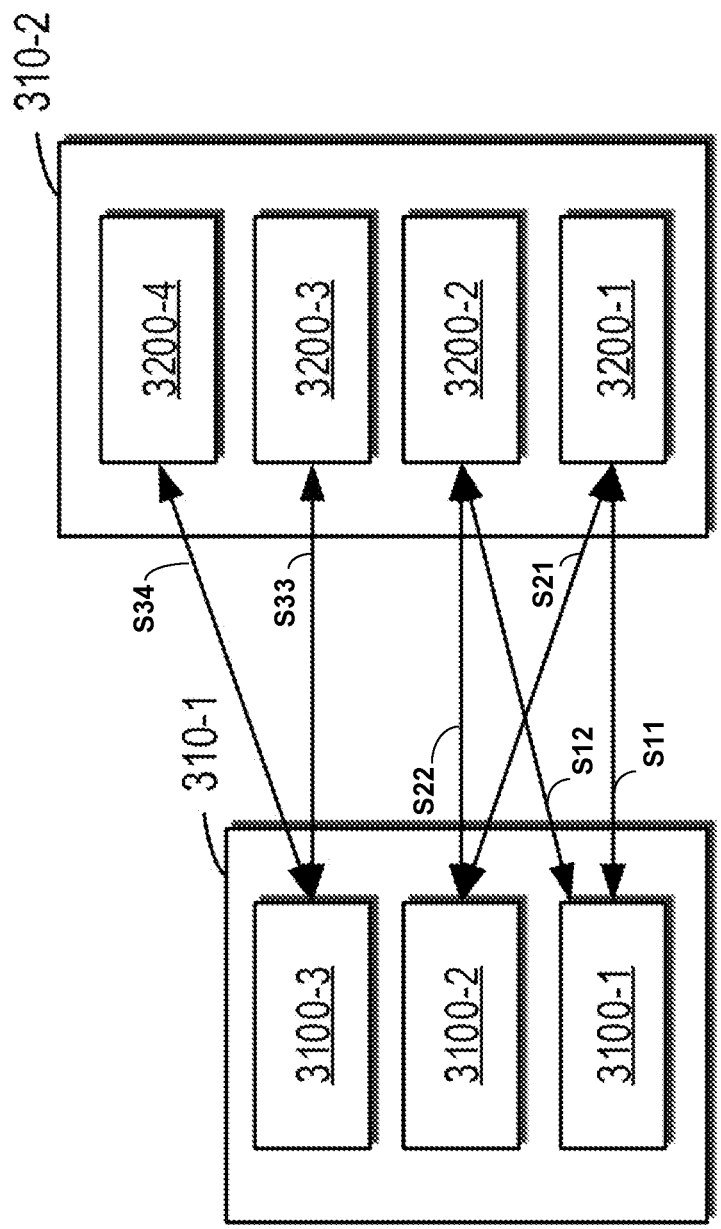
FIG. 5 shows a schematic block diagram for determining an image similarity according to embodiments of the present disclosure.

FIG. 5 shows a schematic block diagram for determining an image similarity according to embodiments of the present disclosure. For the illustration purpose only, calculating the Hamming distance to obtain the group of similarity is taken as an example in this specification. In the example shown in FIG. 5, the device 100 may determine a similarity between the layer 3100-1 and the layer 3200-1 by calculating the Hamming distance between the index value of the layer 3100-1 of the first image 310-1 and the index value of the layer 3200-1 of the second image 310-2, which is denoted as S11. Similarly, the device 110 may determine a similarity S12 between the layer 3100-1 and the layer 3200-2, a similarity S21 between the layer 3100-2 and the layer 3200-1, a similarity S22 between the layer 3100-2 and the layer 3200-2, a similarity S33 between the layer 3100-3 and the layer 3200-3, a similarity S34 between the layer 3100-3 and the layer 3200-4. Therefore, the device 100 may obtain a group of similarities {S11, S12, S21, S22, S33, S34}.

It should be understood embodiment shown in FIG. 5 is merely an example and not limitations. In some embodiments, the device 100 may only determine a similarity between corresponding layers of the first image 310-1 and the second image 310-2. In other embodiments, the device 100 may determine similarities between any layer of the first image 310-1 and all layers of the second images 310-2. In a further embodiment, the device 100 may determine similarities between an arbitrary number of layers of the first image 310-1 and an arbitrary number of layers of the second image 310-2.

In this example embodiment, the device 100 may obtain a similarity between the first image 310-1 and the second image 310-2 based on the group of similarities. For an example only, as described above, the device 100 obtains the group of similarities {S11, S12, S21, S22, S33, S34}. The device may determine the similarity between the first image 310-1 and the second image 310-2 from Formula (1).

$$S_{im} = \sqrt{\frac{s_{1,1}^2 + s_{1,2}^2 + \ldots + s_{m,p}^2}{n}} \quad (1)$$

wherein $S_{im}$ represents a similarity between two images, n represents the number of similarities in the group of similarities, $S_{m,p}$ represents a similarity between the m layer of one of the two images and the p layer of the other of the two images, where m, n and p are all natural numbers greater than 0. For example, $S_{1,1}$ represents a similarity between the first layer of one image and the first layer of the other image, $S_{1,2}$ represents a similarity between the first layer of one image and the second layer of the other image.

It should be understood the similarity between the first image 310-1 and the second image 310-2 may be determined by using other approaches. For example, the similarity between the first image 310-1 and the second image 310-2 may be determined by determining an average value of the group of similarities. In an example embodiment, the device 100 may store the similarity between the first image 310-1 and the second image 310-2 in the storage 120. The device 100 may also store the similarity between the first image 310-1 and the second image 310-1 in a remotely accessible storage device.

In this way, the similarity between images may be determined based on respective image contents, so that it is beneficial to group images and generate content tags.

At block 440, the device 100 generates a tag associated with at least one of the first image 310-1 and the second image 310-2 based on the similarity. Only as an example, in one embodiment, if contents of the first image 310-1 are known, then the device 100 may determine a tag indicating contents of the first image 310-1. In other words, the device 100 determines the first image 310-1 with known contents to be a trustable image. If the similarity between the second image 310-2 and the first image 310-1 exceeds a predefined value, then the device 100 may assign the tag of the first image 310-1 to the second image 310-2.

In some embodiments, if similarities between the second image 310-2 and a plurality of trustable images exceed a predefined value, then the device 100 may assign tags of the plurality of trustable images to the second image 310-2. The predefined value may be pre-configured in the device 100. The device 100 may also dynamically determine the predefined value.

In this way, the device 100 may generate a content-based tag for an image, and the tag is trustable. Therefore, what is determined is the tag indicating actual contents of the image rather than a tag added by a creator of the image.

Figure 6:
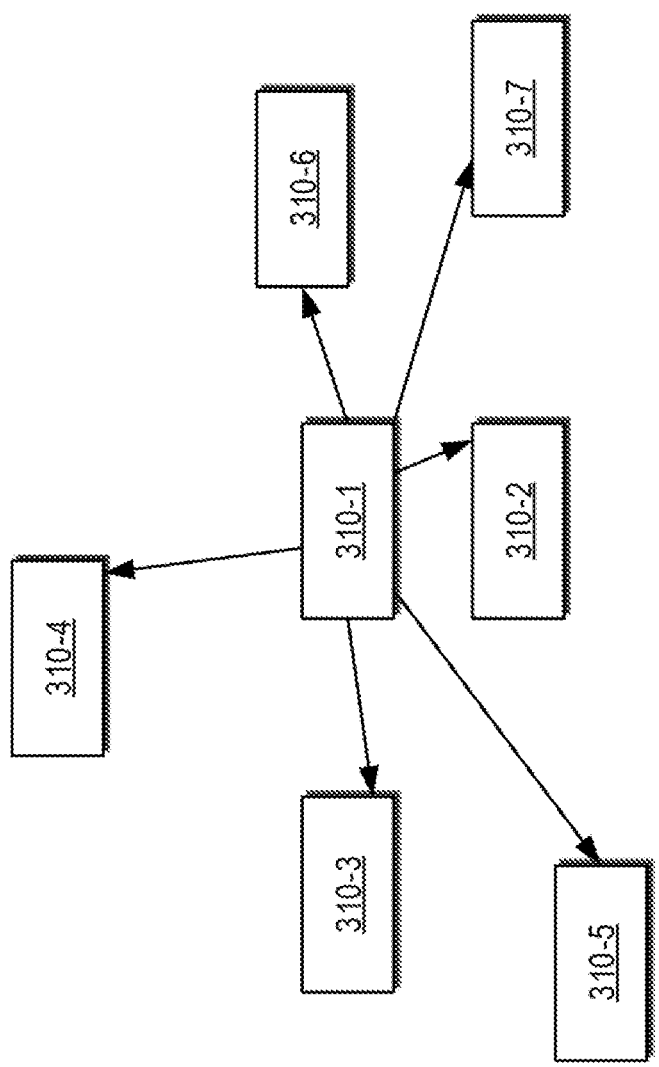
FIG. 6 shows a schematic block diagram for determining image groups according to embodiments of the present disclosure.

In some embodiments, if the similarity between the first image 310-1 and the second image 310-2 is higher than a first similarity threshold, then the device 100 stores the first image 310-1 and the second image 310-2 in the same group. FIG. 6 shows a schematic block diagram for determining image groups according to embodiments of the present disclosure. It should be understood the number of images shown in FIG. 6 is merely an example. Only as an example, in some embodiments, the device 100 determines a similarity between the first image 310-1 and the second image 310-2, which is denoted as $S_{im1,2}$. Similarly, the device 100 may determine a similarity $S_{im1,3}$ between the first image 310-1 and a third image 310-3, a similarity $S_{im1,4}$ between the first image 310-1 and a fourth image 310-4, a similarity $S_{im1,5}$ between the first image 310-1 and a fifth image 310-5, and determine a similarity $S_{im1,6}$ between the first image 310-1 and a sixth image 310-6.

Only as an example, the device 100 may determine the similarities among the first image 310-1, the second image 310-2 and the sixth image 310-6 are higher than a predefined value and store the first image 310-1, the second image 310-2 and the sixth image 310-6 in a same group. The predefined value may be pre-configured in the device 100. The device 100 may also dynamically determine the predefined value. In some embodiments, the first image 310-1, the second image 310-2 and the sixth image 310-6 may be stored in the storage 120 or a remotely accessible storage device in the form of a matrix. In other example embodiments, the first image 310-1, the second image 310-2 and the sixth image 310-6 may be stored in the storage 120 or a remotely accessible storage device in the form of a table. It should be understood groups of images may be stored in any suitable manners, and the number of images in each group is arbitrary. In this way, the device 100 may generate a database comprising similarities between images, thereby helping to manage and search for images.

In another embodiment, if the similarity between the first image 310-1 and the second image 310-2 is higher than a predefined value, the device 100 may assign the same tags to the first image 310-1 and the second image 310-2, and the first image 310-1 and the second image 310-2 are stored in the same group. The predefined value may be pre-configured in the device 100. The device 100 may also dynamically determine the predefined value. As an example, the first image 310-1 and the second image 310-2 may be stored in the form of a matrix, a table or in any other suitable form.

In some embodiments, the device 100 determines the number of specific tags in a group of images exceeds a specific value, then the device 100 assigns the tag to each image in the group. Only as an example, the device 100 determines that the first image 310-1 and the second image 310-2 in the group which comprises the first image 310-1, the second image 310-2 and the sixth image 310-6 have a "database" tag respectively, then the device 100 assigns the "database" tag to the sixth image 310-6.

In some embodiments, as described above, there exists some trustable images, and then the device 100 may assign the tag of the trustable images to all images in a group to which the trustable images belong.

In an example embodiment, the device 100 receives a seventh image 310-7 via the input 130. The device 100 may compare the seventh image 310-7 with a trustable image so as to determine a tag of the seventh image 310-7. In other embodiments, the device 100 may further determine a group to which the seventh image 310-7 belongs and store the seventh image 310-7 in the group based on a similarity between the seventh image 310-7 and a previous image.

In this way, if the user inputs a keyword for searching image, then the device 100 may compare the keyword with stored tags and determine an image group with a tag matching with the keyword as a candidate result. The device 100 may further optimize the candidate result according to historical download times, user scores, etc.

Figure 7:
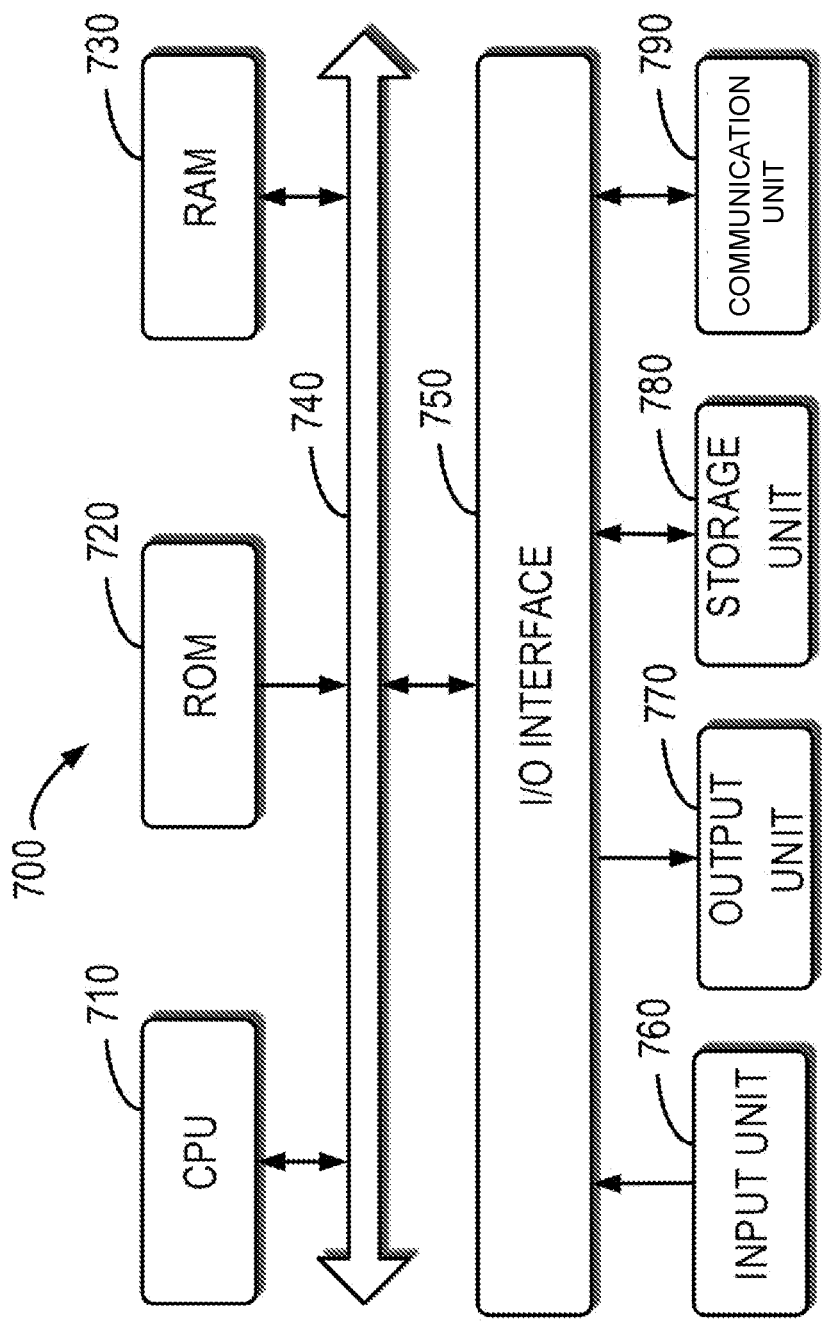
FIG. 7 shows a schematic block diagram of a device according to embodiments of the present disclosure.

FIG. 7 illustrates a schematic block diagram of an electronic device 700 for implementing embodiments of the present disclosure. It may be understood that the electronic device 700 may be implemented at the processing unit 110 or the storage 120 shown in FIG. 1. As shown, the device 700 includes a central process unit (CPU) 710, which can execute various suitable actions and processing based on the computer program instructions stored in the read-only memory (ROM) 720 or computer program instructions loaded in the random-access memory (RAM) 730 from a storage unit 780. The RAM 730 can also store all kinds of programs and data required by the operations of the device 700. CPU 710, ROM 720 and RAM 730 are connected to each other via a bus 740. The input/output (I/O) interface 750 is also connected to the bus 740.

A plurality of components in the device 700 is connected to the I/O interface 750, including: an input unit 760, such as keyboard, mouse and the like; an output unit 770, e.g., various kinds of display and loudspeakers etc.; a storage unit 780, such as disk and optical disk etc.; and a communication unit 790, such as network card, modem, wireless transceiver and the like. The communication unit 790 allows the device 700 to exchange information/data with other devices via the computer network, such as Internet, and/or various telecommunication networks.

The above described each procedure and processing, such as the procedures 200, 300 and 400, can also be executed by the processing unit 710. For example, in some embodiments, the procedures/methods 200, 300 and 400 can be implemented as a computer software program tangibly included in the machine-readable medium, e.g., storage unit 780. In some embodiments, the computer program can be partially or fully loaded and/or mounted to the device 700 via ROM 720 and/or communication unit 790. When the computer program is loaded to RAM 730 and executed by the CPU 710, one or more actions of the above described methods 200, 300 and 400 can be implemented. Alternatively, in other embodiments, the CPU 710 may also be configured in any other suitable way so as to implement the above procedures.

The present disclosure can be method, device and/or computer program product. The computer program product can include a computer-readable storage medium, on which the computer-readable program instructions for executing various aspects of the present disclosure are loaded.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination thereof. More specific examples (a non-exhaustive list) of the computer readable storage medium would include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or downloaded to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, by means of state information of the computer readable program instructions, an electronic circuitry including, for example, programmable logic circuitry, field-programmable gate arrays (FPGA), or programmable logic arrays (PLA) can be personalized to execute the computer readable program instructions, thereby implementing various aspects of the present disclosure.

Aspects of the present disclosure are described herein with reference to flowchart and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which are executed on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of codes, which comprises one or more executable instructions for implementing the specified logical function(s). In some alternative implementations, the functions noted in the block may be implemented in an order different from those illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The descriptions of the various embodiments of the present disclosure have been presented for illustration purposes, but are not intended to be exhaustive or limited to the embodiments disclosed. Many modifications and variations will be apparent to those of skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method for generating an image tag for one or more computational container images, comprising:
    determining, based on a first image, a first group of index values, each index value in the first group of index values indicating a content of each layer of a plurality of layers of the first image;
    determining, based on a second image, a second group of index values, each index value in the second group of index values indicating a content of each layer of a plurality of layers of the second image;

determining a similarity between the first image and the second image based on the first group of index values and the second group of index values; and generating, based on the similarity, a tag associated with at least one of the first image and the second image;

wherein generating the tag associated with at least one of the first image and the second image comprises:

determining the tag based on at least a portion of a content of the first image being known;

associating the tag with the first image; and in response to the similarity exceeding a similarity threshold, assigning the tag of the first image to the second image; and wherein the first and second images comprise respective container images of respective computational containers of at least one processing device.

2. The method of claim 1, wherein determining the first group of index values comprises:

obtaining the content of each layer of the first image; and determining one index value for the content of each layer.

3. The method of claim 1, wherein determining a similarity between the first image and the second image comprises:

obtaining a group of similarities by comparing at least one value in the first group of values with a group of candidate values in the second group, respectively; and determining the similarity between the first image and the second image based on the group of similarities.

4. The method of claim 1, wherein determining a similarity between the first image and the second image comprises:

determining the similarity between the first image and the second image based on at least one of:

a Hamming distance;

an edit distance;

an Euclidean distance; and an included angle cosine value.

5. The method of claim 1, wherein generating a tag associated with at least one of the first image and the second image comprises:

in response to the similarity between the first image and the second image exceeding a similarity threshold, assigning a first tag to the first image and the second image, respectively; and storing the first image and the second image in a same group.

6. The method of claim 5, further comprising:

determining a number of images with the first tag in the group; and in response to the number of images with the first tag exceeding a threshold number, assigning the first tag to all images in the group.

7. A device for generating an image tag for one or more computational container images, comprising:

at least one processor; and a memory coupled to the at least one processor, the memory having instructions stored thereon, the instructions, when executed by the at least one processor, causing the device to perform acts including:

determining, based on a first image, a first group of index values, each index value in the first group of index values indicating a content of each layer of a plurality of layers of the first image;

determining, based on a second image, a second group of index values, each index value in the second group of index values indicating a content of each layer of a plurality of layers of the second image;

determining a similarity between the first image and the second image based on the first group of index values and the second group of index values; and generating, based on the similarity, a tag associated with at least one of the first image and the second image;

wherein generating the tag associated with at least one of the first image and the second image comprises:

determining the tag based on at least a portion of a content of the first image being known;

associating the tag with the first image; and in response to the similarity exceeding a similarity threshold, assigning the tag of the first image to the second image; and wherein the first and second images comprise respective container images of respective computational containers of at least one processing device.

8. The device of claim 7, wherein determining the first group of index values comprises:

obtaining the content of each layer of the first image; and determining one index value for the content of each layer.

9. The device of claim 7, wherein determining a similarity between the first image and the second image comprises:

obtaining a group of similarities by comparing at least one value in the first group of values with a group of candidate values in the second group respectively; and determining the similarity between the first image and the second image based on the group of similarities.

10. The device of claim 7, wherein determining a similarity between the first image and the second image comprises:

determining the similarity between the first image and the second image based on at least one of:

a Hamming distance;

an edit distance;

an Euclidean distance; and an included angle cosine value.

11. The device of claim 7, wherein generating a tag associated with at least one of the first image and the second image comprises:

in response to the similarity between the first image and the second image exceeding a similarity threshold, assigning a first tag to the first image and the second image respectively; and storing the first image and the second image in a same group.

12. The device of claim 11, wherein the acts further comprise:

determining a number of images with the first tag in the group; and in response to the number of images with the first tag exceeding a threshold number, assigning the first tag to all images in the group.

13. A computer program product for generating an image tag for one or more computational container images, the computer program product comprising:

a non-transitory computer readable medium encoded with computer-executable program code, the code configured to enable the execution of:

determining, based on a first image, a first group of index values, each index value in the first group of index values indicating a content of each layer of a plurality of layers of the first image;

determining, based on a second image, a second group of index values, each index value in the second group of index values indicating a content of each layer of a plurality of layers of the second image;

determining a similarity between the first image and the second image based on the first group of index values and the second group of index values; and generating, based on the similarity, a tag associated with at least one of the first image and the second image;

wherein generating the tag associated with at least one of the first image and the second image comprises:

determining the tag based on at least a portion of a content of the first image being known;

associating the tag with the first image; and in response to the similarity exceeding a similarity threshold, assigning the tag of the first image to the second image; and wherein the first and second images comprise respective container images of respective computational containers of at least one processing device.

14. The computer program product of claim 13, wherein determining the first group of index values comprises:

obtaining the content of each layer of the first image; and determining one index value for the content of each layer.

15. The computer program product of claim 13, wherein determining a similarity between the first image and the second image comprises:

obtaining a group of similarities by comparing at least one value in the first group of values with a group of candidate values in the second group, respectively; and determining the similarity between the first image and the second image based on the group of similarities.

16. The computer program product of claim 13, wherein determining a similarity between the first image and the second image comprises:

determining the similarity between the first image and the second image based on at least one of:

a Hamming distance;

an edit distance;

an Euclidean distance; and an included angle cosine value.

17. The computer program product of claim 13, wherein generating a tag associated with at least one of the first image and the second image comprises:

in response to the similarity between the first image and the second image exceeding a similarity threshold, assigning a first tag to the first image and the second image, respectively; and storing the first image and the second image in a same group.

18. The computer program product of claim 17, wherein the code is further configured to enable the execution of:

determining a number of images with the first tag in the group; and in response to the number of images with the first tag exceeding a threshold number, assigning the first tag to all images in the group.

19. The computer program product of claim 15, wherein determining the similarity between the first image and the second image based on the group of similarities comprises determining an average value of the group of similarities.

20. The method of claim 3, wherein determining the similarity between the first image and the second image based on the group of similarities comprises determining an average value of the group of similarities.

* * * * *